United States Patent
Liu et al.

(10) Patent No.: US 10,958,396 B2
(45) Date of Patent: Mar. 23, 2021

(54) METHOD AND DEVICE FOR SENDING REFERENCE SIGNAL

(71) Applicant: HUAWEI TECHNOLOGIES CO., LTD., Guangdong (CN)

(72) Inventors: Jin Liu, Shenzhen (CN); Xiaoyan Bi, Shanghai (CN); Shibin Ge, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 80 days.

(21) Appl. No.: 16/188,812

(22) Filed: Nov. 13, 2018

(65) Prior Publication Data

US 2019/0081761 A1 Mar. 14, 2019

Related U.S. Application Data

(63) Continuation of application No. PCT/CN2017/079455, filed on Apr. 5, 2017.

(30) Foreign Application Priority Data

May 13, 2016 (CN) .......................... 201610322321.2

(51) Int. Cl.
*H04L 5/00* (2006.01)
*H04L 27/26* (2006.01)
(Continued)

(52) U.S. Cl.
CPC .......... *H04L 5/0053* (2013.01); *H04B 7/0617* (2013.01); *H04J 13/0062* (2013.01);
(Continued)

(58) Field of Classification Search
CPC .. H04B 7/0413; H04B 7/0452; H04B 7/0617; H04J 11/005; H04J 13/0062;
(Continued)

(56) References Cited

U.S. PATENT DOCUMENTS

| 8,761,116 B2* | 6/2014 | Dai ...................... H04L 5/0092 370/330 |
| 2011/0317641 A1* | 12/2011 | Noh ..................... H04L 1/0027 370/329 |

(Continued)

FOREIGN PATENT DOCUMENTS

| CN | 101662443 A | 3/2010 |
| CN | 102437987 A | 5/2012 |

(Continued)

OTHER PUBLICATIONS

International Search Report and Written Opinion issued in International Application No. PCT/CN2017/076455 dated Jun. 28, 2017, 12 pages.

(Continued)

*Primary Examiner* — Eric Nowlin
(74) *Attorney, Agent, or Firm* — Fish & Richardson P.C.

(57) ABSTRACT

The present disclosure relates to a method for sending cell common control reference information. In one example method, before common control information needs to be sent, a base station having M antenna ports generates the cell control reference information used to detect the common control information. The base station maps the common control information and the cell control reference information to one or more resource units (RUs) of N antenna ports. The N antenna ports are a subset of the M antenna ports. The base station uses the one or more RUs to send the common control information and the cell control reference information used to detect the common control information to a user equipment (UE) within a coverage area of the base station.

12 Claims, 5 Drawing Sheets

(51) Int. Cl.
*H04B 7/06* (2006.01)
*H04J 13/00* (2011.01)
*H04W 72/04* (2009.01)
*H04J 11/00* (2006.01)
*H04B 7/0452* (2017.01)
*H04B 7/0413* (2017.01)

(52) U.S. Cl.
CPC ............ *H04L 5/005* (2013.01); *H04L 27/261* (2013.01); *H04W 72/0406* (2013.01); *H04W 72/0453* (2013.01); *H04B 7/0413* (2013.01); *H04B 7/0452* (2013.01); *H04J 11/005* (2013.01)

(58) Field of Classification Search
CPC ..... H04L 5/005; H04L 5/0053; H04L 27/261; H04W 72/0406; H04W 72/0453
See application file for complete search history.

(56) References Cited

U.S. PATENT DOCUMENTS

| | | | | |
|---|---|---|---|---|
| 2012/0093122 | A1* | 4/2012 | Dai | H04L 5/0048 370/330 |
| 2012/0106493 | A1* | 5/2012 | Noh | H04L 5/0007 370/329 |
| 2012/0219094 | A1 | 8/2012 | Lindoff et al. | |
| 2012/0257553 | A1* | 10/2012 | Noh | H04L 5/0057 370/280 |
| 2012/0300653 | A1 | 11/2012 | Kishiyama et al. | |
| 2014/0050189 | A1* | 2/2014 | Shimezawa | H04B 7/024 370/329 |
| 2014/0321421 | A1* | 10/2014 | Popovic | H04L 5/0051 370/330 |
| 2014/0376456 | A1 | 12/2014 | Kim et al. | |
| 2015/0087324 | A1 | 3/2015 | Ishida et al. | |
| 2015/0208397 | A1 | 7/2015 | Lee et al. | |
| 2015/0223156 | A1 | 8/2015 | Park et al. | |
| 2015/0230220 | A1 | 8/2015 | Li et al. | |
| 2015/0312958 | A1 | 10/2015 | Cheng et al. | |
| 2015/0341918 | A1 | 11/2015 | Yang et al. | |
| 2016/0192338 | A1* | 6/2016 | Benjebbour | H04L 5/0023 370/330 |
| 2017/0273059 | A1 | 9/2017 | You et al. | |
| 2018/0092075 | A1* | 3/2018 | Kim | H04W 24/10 |
| 2018/0310283 | A1* | 10/2018 | Deenoo | H04W 72/042 |
| 2019/0173711 | A1* | 6/2019 | Cheng | H04L 5/00 |

FOREIGN PATENT DOCUMENTS

| | | |
|---|---|---|
| CN | 102714564 A | 10/2012 |
| CN | 103036601 A | 4/2013 |
| CN | 103370913 A | 10/2013 |
| CN | 104956612 A | 9/2015 |
| EP | 2843984 A1 | 3/2015 |
| JP | 2013524569 A | 6/2013 |
| JP | 2015012408 A | 1/2015 |
| WO | 2014067074 A1 | 5/2014 |
| WO | 2014208141 A1 | 12/2014 |
| WO | 2016047106 A1 | 3/2016 |
| WO | 2016048055 A1 | 3/2016 |

OTHER PUBLICATIONS

Extended European Search Report issued in European Application No. 17795352.8 dated Feb. 12, 2019, 9 pages.
3GPP TS 36.211 V13.1.0 (Mar. 2016), "3rd Generation Partnership Project; Technical Specification Group Radio Access Network; Evolved Universal Terrestrial Radio Access (E-UTRA); Physical channels and modulation (Release 13)," Mar. 2016, 155 pages.
Office Action issued in Japanese Application No. 2018-559797 dated Nov. 25, 2019, 9 pages (with English translation).
Office Action issued in Chinese Application No. 201610322321.2 dated Sep. 11, 2020, 9 pages (with English translation).
Qualcomm Incorporated, "Phase 1 Evaluation of Heterogeneous Scenarios," 3GPP TSG-RAN WG1 #80, R1-150480, Athens, Greece, Feb. 9-13, 2015, 3 pages.
Samsung, "Performance results for implementation based enhancement schemes" 3GPP TSG RAN WG1 Meeting #80bis, R1-151633, Belgrade, Serbia, Apr. 20-24, 2015, 7 pages.

* cited by examiner

METHOD AND DEVICE FOR SENDING
REFERENCE SIGNAL

CROSS-REFERENCE TO RELATED
APPLICATIONS

This application is a continuation of International Application No. PCT/CN2017/079455, filed on Apr. 5, 2017, which claims priority to Chinese Patent Application No. 201610322321.2, filed on May 13, 2016. The disclosures of the aforementioned applications are hereby incorporated by reference as if reproduced in their entireties.

TECHNICAL FIELD

Embodiments of this application relate to the field of communications technologies, and more specifically, to a method for sending a reference signal used to detect common control information or multicast/broadcast information in wireless communications.

BACKGROUND

A current wireless communications technology has been developed into a Long Term Evolution (LTE) system. FIG. 1 is used as an example. The existing LTE system includes a plurality of cells. Each cell includes one base station 11 and a plurality of UEs 12. The base station sends common control information and data, and a reference signal used to detect the common control information and the data to the UEs.

In existing LTE R8 to R12 systems, there are mainly three types of reference signals used for downlink channel measurement and data demodulation: a cell-specific reference signal (CRS), a demodulation reference signal (DMRS), and a channel state information-reference signal (CRS-RS). In LTE transmission modes 1 to 6, the reference signal used for the downlink channel measurement and the data demodulation is only the CRS; that is, the CRS is used for both channel detection and coherent demodulation of broadcast, control, and data signals. In LTE transmission modes 7 and 8, pairs of DMRSs are introduced, and are used for coherent demodulation of a data signal; and the CRS is used for channel detection and coherent demodulation of common control information. In LTE transmission modes 9 and 10, the CSI-RS is further introduced. The CRS is used for coherent demodulation of control information, the DMRS is used for coherent demodulation of a data signal, and the CSI-RS is used for multi-antenna port detection/multi-point channel detection.

The CRS is initially introduced in the LTE Release (Release 8), and is a basic downlink reference signal of the LTE system. The CRS is mainly used in the following aspects: channel detection, coherent demodulation of data, and coherent demodulation of a broadcast signal and a control signal (that is, the common control information).

The CRS is generated by a pseudo-random sequence, and the pseudo-random sequence includes a Gold sequence whose length is 31. A total sequence length of the CRS is 8800 symbols. The sequence of the CRS is mapped on each downlink subframe in time domain, and is mapped on each resource block in frequency domain.

At the beginning of CRS design (the transmission modes 1 to 6), the CRS is not only responsible for coherent demodulation of broadcast and control signals, but also responsible for channel detection and coherent demodulation of data signals for each user equipment (UE). Therefore, receiving objects of the CRS are all UEs in a cell. The CRS cannot perform directional transmission for each UE. Consequently, array gains cannot be obtained in a multi-antenna port scenario. In addition, because the CRS cannot perform precoding processing, a transmission solution is only a nontransparent precoding scheme for the UE. This reduces flexibility of the precoding scheme, and increases downlink control signaling overheads, to indicate a precoding matrix used in current transmission. A percentage of total overheads is 14.3%.

To implement transparent precoding processing and higher-order multi-antenna port transmission, starting from the transmission mode 7, the DMRS is introduced in the LTE system, and is specially used for channel estimation for coherent demodulation of data signals.

Different from the CRS, two DMRSs corresponding to an antenna port share 12 same REs (resource element; Resource Element) on a pair of PRBs (physical resource block; Physical Resource Block; usually, PRB for short). The two DMRSs are mutually orthogonal by using different orthogonal cover codes (OCC). A same pseudo-random base sequence is used in two layers of data streams of a same UE, and different OCCs are used to ensure orthogonality. Different pseudo-random base sequences are used in two layers of data streams from different UEs. Different DMRSs are mapped in a code division multiplexing (CDM) manner. Extension can be easily performed to support higher order multiple-input multiple-output (MIMO) transmission. Therefore, overheads occupied by four layers of DMRSs and overheads occupied by eight layers of DMRSs are the same: their percentages are both 14.3%.

To support higher order MIMO transmission and coordinated multipoint transmission, starting from the transmission mode 9, the LTE system is further optimized, and the CSI-RS is introduced and is specially used for channel detection in a multi-antenna port scenario. A reference signal time-frequency density required in this type of channel detection is relatively low. Therefore, reference signal design with low overheads may be used. However, overall reference signal overheads are relatively high, and a percentage of total overheads of reference signals is up to 30% when 8-layer transmission is supported.

The MIMO technology mentioned herein was introduced in the industry at the end of the 20th century, and has been widely used because a system capacity can be effectively improved. Particularly, with development of a $5^{th}$ Generation (5G) wireless communications system, a massive multiple-input multiple-output (M-MIMO) technology begins to draw attention. Compared with the conventional MIMO technology, the M-MIMO technology has advantages such as relatively simple radio resource allocation, no need for a rich scattering environment, and capability to provide a service for a cost effective UE with a single antenna port. Therefore, the M-MIMO attracts wide attention in the industry.

After the M-MIMO technology is introduced, an extremely narrow beam may be generated because the M-MIMO has a relatively large quantity of antenna ports (solution 1 in FIG. 2), and a transmit power is concentrated on an extremely small space to obtain relatively high array gains, so that throughput and energy efficiency are significantly improved. Because the beam is relatively narrow, interference to another UE is low, and the beam is extremely suitable for sending a UE-specific signal for a specific UE, such as UE-specific data and a UE-specific control signal. Relatively, for cell-specific signals that need to be sent to all UEs or most UEs in a cell, for example, a multicast message, a broadcast message, and a control signal, to enable all UEs within a coverage area to receive these cell-specific signals (without loss of generality, these cell-specific signals are collectively referred to as common control information in this application, and correspondingly, a channel that carries the common control information is a common control channel) and to detect reference signals of the common control information, a base station needs to generate a wide beam similar to omni-directional transmission (omni-directional transmission) by using the M-MIMO technology, or generate a wide beam whose width is 120 degrees in three-sector configuration (refer to solution 2 in FIG. 2). Unfortunately, using the wide beam may lead to loss of array gains, and consequently, a transmission distance is reduced. Therefore, a UE on an edge of the cell usually fails to receive the cell-specific signal or receives the cell-specific signal with extremely poor quality. This is a contradiction. Therefore, it is often necessary to make a compromise between the array gains (or a beam width) and the coverage area, that is, solution 3 in FIG. 2. However, solution 3 still fails to fundamentally resolve the contradiction between the array gains and the coverage area.

SUMMARY

Embodiments of this application provide a method and base station for sending cell control reference information. In addition, the embodiments of this application provide a method and UE for receiving cell control reference information.

According to a first aspect, an embodiment of this application provides a method for sending cell control reference information. The method includes: generating, by a base station having M antenna ports before common control information needs to be sent, the cell control reference information used to detect the common control information; then, mapping, by the base station, the common control information and the cell control reference information to one or more resource units RUs of N antenna ports by using the N antenna ports of the M antenna ports, where the N antenna ports are some of the M antenna ports; and sending, by the base station by using the one or more RUs, the common control information and the cell control reference information used to detect the common control information to a UE within a coverage area of the base station. In this way, a method in which power of an entire frequency band is concentrated on the one or more resource units RUs of the N antenna ports may be used to effectively enhance coverage, without affecting data transmission on another RU.

In a possible design, the generating, by a base station before common control information needs to be sent, the cell control reference information used to detect the common control information includes: generating, by the base station, a to-be-mapped cell control reference signal sequence based on a pseudo-random sequence before the common control information needs to be sent. An advantage of using the pseudo-random sequence is that there is usually relatively good orthogonality between the pseudo-random sequences. In this case, even if a collision occurs on cell control reference information of neighboring cells on a time-frequency resource, a relatively good detection feature can be ensured.

In a possible design, the generating, by the base station, a to-be-mapped cell control reference signal sequence based on a pseudo-random sequence is specifically: generating, by the base station, the to-be-mapped cell control reference signal sequence based on one or more of the following generation parameters: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs. In the foregoing manner of generating a cell control reference signal sequence by using a plurality of parameters, better orthogonality of cell control reference signal sequences of cells can be ensured as much as possible.

In a possible design, the pseudo-random sequence is initialized in the following manner:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3, \text{ where}$$

$c(0)$ is an initial value of the pseudo-random sequence, $n_s$ is a subframe sequence number when the base station sends the common control information and the cell control reference information, $l$ is a symbol sequence number of the cell control reference information in a subframe when the base station sends the cell control reference information, $N_{ID}^{cell}$ is an ID of a cell in which the base station is located, $p_1$ is a sequence number/sequence numbers of the one or more RUs, $p_2$ is an antenna port number of an antenna port of the N antenna ports, $p_3$ is a frame sequence number when the base station sends the common control information and the cell control reference information, and $\alpha_1$, $\alpha_2$, and $\alpha_3$ are coefficients.

In a possible design, any one or more of the coefficients $\alpha_1$, $\alpha_2$, and $\alpha_3$ may be 0. For example, when $\alpha_1$ is 0, an antenna port number may not be considered. In addition, there is a similar meaning when the other two coefficients are 0.

In a possible design, the generating a to-be-mapped cell control reference signal sequence based on a pseudo-random sequence is: generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

where j is an imaginary number symbol, c(m) is the pseudo-random sequence, m is a subcarrier sequence number of the RU in which the cell control reference signal is located, m=0, 1, . . . , and $xN_{RU}^{CCRS,DL}-1$, x represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

In a possible design, the pseudo-random sequence is a Gold sequence, an m sequence, or a Zadoff-Chu sequence.

In a possible design, mapping the to-be-mapped cell control reference signal sequence to one or more RUs of the N antenna ports includes: mapping all or some to-be-mapped cell control reference signal sequences to the one or more RUs of the N antenna ports based on a preset mapping pattern.

In a possible design, the mapping all or some to-be-mapped cell control reference signal sequences to the one or more RUs of the N antenna ports based on a preset mapping pattern includes: mapping all or some to-be-mapped cell control reference signal sequences to the one or more RUs of the N antenna ports based on one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

In a possible design, the mapping pattern is determined by the base station based on one or more of the following generation parameters on the common control channel on which the cell control reference information is located, where the generation parameters include: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the base station sends one or more of the following generation parameters to the UE within the coverage area of the base station: a quantity of RUs in which the cell control reference information is located, a location of an RU in which the cell control reference information is located on a time-frequency resource, a value of N, a generation method of the cell control reference information, a mapping pattern of the cell control reference information on the RU, a pseudo-random sequence, a sub-band sequence number, and an index number of a generation parameter set that includes the generation parameters. In this manner, the base station may update or adjust, based on factors such as a channel status, a load status, and an interference status, parameters such as a period, a location, and the like that are used for sending the common control information and the cell control reference information, so that system resources can be effectively scheduled.

In a possible design, the N antenna ports are preset or are selected by the base station from the M antenna ports.

In a possible design, each RU includes at least one consecutive subcarrier in frequency domain and at least one consecutive symbol in time domain.

In a possible design, the sending, by the base station, the common control information and the cell control reference information to a UE within a coverage area of the base station by using the one or more RUs includes: sending, by the base station by using a high power spectrum density method, the common control information and the cell control reference information to the UE within a coverage area of the base station by using the one or more RUs.

In a possible design, the common control information and the cell control reference information of different sub-bands are sent in a same subframe.

In a possible design, the common control information and the cell control reference information of different sub-bands are sent by using the same N antenna ports.

According to a second aspect, a method for receiving a cell control reference signal is provided, including: receiving, by a UE, a signal sent by a base station on one or more resource units RUs of N antenna ports, where the signal includes common control information and cell control reference information used to detect the common control information, and the N antenna ports are some of M antenna ports of the base station; generating, by the UE, the cell control reference information used to detect the common control information; and obtaining, by the UE based on the cell control reference information, the common control information from the signal used to detect the common control information.

In a possible design, the generating, by the UE, the cell control reference information used to detect the common control information includes: generating, by the UE, a to-be-mapped cell control reference signal sequence based on a pseudo-random sequence.

In a possible design, the generating, by the UE, a to-be-mapped cell control reference signal sequence based on a pseudo-random sequence is specifically: generating, by the UE, the to-be-mapped cell control reference signal sequence based on one or more of the following generation parameters: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the pseudo-random sequence is initialized in the following manner:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3, \text{ where}$$

c(0) is an initial value of the pseudo-random sequence, $n_s$ is a subframe sequence number when the UE receives the signal, l is a symbol sequence number of the cell control reference information in a subframe when the UE receives the signal, $N_{ID}^{cell}$ is an ID of a cell in which the UE is located, $p_1$ is a sequence number/sequence numbers of the one or more RUs, $p_2$ is an antenna port number of an antenna port of the N antenna ports, $p_3$ is a frame sequence number when the UE receives the signal, and $\alpha_1$, $\alpha_2$, and $\alpha_3$ are coefficients.

In a possible design, any one or more of the coefficients $\alpha_1$, $\alpha_2$, and $\alpha_3$ are 0. A meaning represented by 0 is the same as that in the foregoing description.

In a possible design, the generating a to-be-mapped cell control reference signal sequence based on a pseudo-random sequence is: generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

where m is a subcarrier sequence number of the RU in which the cell control reference signal is located, m=0, 1, . . . , and $xN_{RU}^{CCRS,DL}-1$, x represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

In a possible design, the pseudo-random sequence is a Gold sequence, an m sequence, or a Zadoff-Chu sequence.

In a possible design, the generating, by the UE, the cell control reference information used to detect the common control information further includes: mapping, by the UE, all or some to-be-mapped cell control reference signal sequences to the one or more RUs of the N antenna ports based on a preset mapping pattern.

In a possible design, the mapping, by the UE, all or some to-be-mapped cell control reference signal sequences to the one or more RUs of the N antenna ports based on a preset mapping pattern includes: mapping, by the UE, all or some to-be-mapped cell control reference signal sequences to the one or more RUs of the N antenna ports based on one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

In a possible design, the mapping pattern is determined by the UE based on one or more of the following generation parameters on the common control channel on which the cell control reference information is located, where the generation parameters may include: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the UE receives one or more of the following generation parameters sent by the base station: a quantity of RUs in which the cell control reference information is located, a location of an RU in which the cell control reference information is located on a time-frequency resource, a value of N, a generation method of the cell control reference information, a mapping pattern of the cell control reference information on the RU, a pseudo-random sequence, a sub-band sequence number, and an index number of a generation parameter set. After receiving these parameters, the UE updates stored parameters.

In a possible design, each RU includes at least one consecutive subcarrier in frequency domain and at least one consecutive symbol in time domain.

In a possible design, the UE receives the common control information and the cell control reference information of different sub-bands in a same subframe.

According to a third aspect, a base station for sending cell control reference information is provided, including M antenna ports, a transmitter, a processor, and a memory. The memory is configured to store program code that can be executed by the processor. The processor is configured to: before common control information needs to be sent, generate, based on the program code stored in the memory, the cell control reference information used to detect the common control information; and map the common control information and the cell control reference information to one or more resource units RUs of N antenna ports, where the N antenna ports are some of the M antenna ports. The transmitter is configured to send, by using the one or more RUs and the N antenna ports, the common control information and the cell control reference information used to detect the common control information to a UE within a coverage area of the base station.

In a possible design, the memory is further configured to store a mapping pattern.

In a possible design, the memory is further configured to store a pseudo-random sequence; and that the processor is configured to: before common control information needs to be sent, generate, based on the program code stored in the memory, the cell control reference information used to detect the common control information includes: the processor is configured to: before the common control information needs to be sent, generate, based on the program code stored in the memory and the pseudo-random sequence, a to-be-mapped cell control reference signal sequence.

In a possible design, that the processor generates, based on the program code stored in the memory and the pseudo-random sequence, the to-be-mapped cell control reference signal sequence is specifically: generating, by the base station, the to-be-mapped cell control reference signal sequence based on one or more of the following generation parameters: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the processor is further configured to initialize the pseudo-random sequence in the following manner based on the program code stored in the memory:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3, \text{ where}$$

$c(0)$ is an initial value of the pseudo-random sequence, $n_s$ is a subframe sequence number when the base station sends the common control information and the cell control reference information, l is a symbol sequence number of the cell control reference information in a subframe when the base station sends the cell control reference information, $N_{ID}^{cell}$ is an ID of a cell in which the base station is located, $p_1$ is a sequence number/sequence numbers of the one or more RUs, $p_2$ is an antenna port number of an antenna port of the N antenna ports, $p_3$ is a frame sequence number when the base station sends the common control information and the cell control reference information, and $\alpha_1$, $\alpha_2$, and $\alpha_3$ are coefficients.

In a possible design, any one or more of the coefficients $\alpha_1$, $\alpha_2$, and $\alpha_3$ are 0. A meaning represented by 0 is the same as that in the foregoing description.

In a possible design, the generating a to-be-mapped cell control reference signal sequence based on a pseudo-random sequence is: generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

where j is an imaginary number symbol, c(m) is the pseudo-random sequence, m is a subcarrier sequence number of the RU in which the cell control reference signal is located, m=0, 1, . . . , and $xN_{RU}^{CCRS,DL}-1$, x represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

In a possible design, the pseudo-random sequence is a Gold sequence, an m sequence, or a Zadoff-Chu sequence.

In a possible design, mapping the cell control reference information to the one or more resource units RUs of the N antenna ports includes: mapping all or some to-be-mapped cell control reference signal sequences to the one or more RUs of the N antenna ports based on a preset mapping pattern.

In a possible design, the mapping all or some to-be-mapped cell control reference signal sequences to the one or more RUs of the N antenna ports based on a preset mapping pattern includes: mapping all or some to-be-mapped cell control reference signal sequences to the one or more RUs of the N antenna ports based on one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

In a possible design, the mapping pattern is determined by the base station based on one or more of the following generation parameters on the common control channel on which the cell control reference information is located: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the memory stores information about the N antenna ports; or the processor is further configured to select the N antenna ports from the M antenna ports.

In a possible design, the transmitter sends one or more of the following generation parameters generated by the processor to the UE within the coverage area of the base station: a quantity of RUs in which the cell control reference information is located, a location of an RU in which the cell control reference information is located on a time-frequency resource, a value of N, a generation method of the cell control reference information, a mapping pattern of the cell control reference information on the RU, a pseudo-random sequence, a sub-band sequence number, and an index number of a generation parameter set that includes the generation parameters. In this manner, the processor may update or adjust, based on factors such as a channel status, a load status, and an interference status, parameters such as a period, a location, and the like that are used for sending the common control information and the cell control reference information, so that system resources can be effectively scheduled. Correspondingly, the processor further updates, based on an updated parameter, the program or the mapping pattern stored in the memory.

In a possible design, the memory is configured to store the generation parameters or the index number of a generation parameter set that includes these generation parameters.

In a possible design, the transmitter is configured to send the common control information and the cell control reference information of different sub-bands in a same subframe.

In a possible design, the N antenna ports are configured to send the common control information and the cell control reference information of different sub-bands.

According to a fourth aspect, a UE for receiving cell control reference information is provided, including an antenna, a receiver, a processor, and a memory, where the receiver receives, by using the antenna, a signal sent by a base station on one or more resource units RUs of N antenna ports, where the signal includes common control information and cell control reference information used to detect the common control information, and the N antenna ports are some of M antenna ports of the base station;

the memory is configured to store program code that can be executed by the processor; the processor is configured to: before the receiver receives the signal, generate, based on the program code stored in the memory, the cell control reference information used to detect the common control information; and the processor is configured to obtain, based on the cell control reference information generated by the processor, the common control information from the signal received by the receiver.

In a possible design, the memory is further configured to store a mapping pattern.

In a possible design, the memory is further configured to store a pseudo-random sequence; and that the processor is configured to: before the receiver receives the signal, generate, based on the program code stored in the memory, the cell control reference information used to detect the common control information includes: the processor is configured to: before the receiver receives the signal, generate, based on the program code stored in the memory and the pseudo-random sequence, a to-be-mapped cell control reference signal sequence.

In a possible design, that the processor generates, based on the program code stored in the memory and the pseudo-random sequence, the to-be-mapped cell control reference signal sequence is specifically: generating, by the processor, the to-be-mapped cell control reference signal sequence based on one or more of the following generation parameters: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, the processor is further configured to initialize the pseudo-random sequence in the following manner based on the program code stored in the memory:

$$c(0)=2^{10} \cdot (7 \cdot (n_s+1)+l+1) \cdot (2 \cdot N_{ID}^{cell}+1)+2 \cdot N_{ID}^{cell}+\alpha_1 p_1+\alpha_2 p_2+\alpha_3 p_3, \text{ where}$$

$c(0)$ is an initial value of the pseudo-random sequence, $n_s$ is a subframe sequence number when the receiver receives the signal, l is a symbol sequence number of the cell control reference information in a subframe when the receiver receives the signal, $N_{ID}^{cell}$ is an ID of a cell in which the UE is located, $p_1$ is a sequence number/sequence numbers of the one or more RUs, $p_2$ is an antenna port number of an antenna port of the N antenna ports, $p_3$ is a frame sequence number when the receiver receives the signal, and $\alpha_1$, $\alpha_2$, and $\alpha_3$ are coefficients.

In a possible design, any one or more of the coefficients $\alpha_1$, $\alpha_2$, and $\alpha_3$ are 0.

In a possible design, the generating a to-be-mapped cell control reference signal sequence based on a pseudo-random sequence is: generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

where j is an imaginary number symbol, $c(m)$ is the pseudo-random sequence, m is a subcarrier sequence number of the RU in which the cell control reference signal is located, $m=0, 1, \ldots,$ and $xN_{RU}^{CCRS,DL}-1$, x represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

In a possible design, the pseudo-random sequence is a Gold sequence, an m sequence, or a Zadoff-Chu sequence.

In a possible design, the generating the cell control reference information used to detect the common control information further includes: mapping all or some to-be-mapped cell control reference signal sequences to the one or more RUs of the N antenna ports based on a preset mapping pattern.

In a possible design, the mapping all or some to-be-mapped cell control reference signal sequences to the one or more RUs of the N antenna ports based on a preset mapping pattern includes: mapping, by the processor, all or some to-be-mapped cell control reference signal sequences to the one or more RUs of the N antenna ports based on one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

In a possible design, the mapping pattern is determined by the processor based on one or more of the following generation parameters on the common control channel on which the cell control reference information is located: port numbers of the N antenna ports, a specific quantity of the one or more RUs, a quantity of subcarriers occupied in any one of the one or more RUs, a quantity of REs occupied in any one of the one or more RUs, an ID of a cell in which the UE is located, time-frequency information (including but not limited to a frame sequence number, a subframe sequence number, a symbol sequence number in a subframe, a subcarrier sequence number, a sequence number/sequence numbers of the one or more RUs, and a sub-band sequence number) when the base station sends the cell control reference information, and a quantity of subcarriers occupied by the cell control reference information on any one of the one or more RUs.

In a possible design, each RU includes at least one consecutive subcarrier in frequency domain and at least one consecutive symbol in time domain.

In a possible design, the receiver receives, by using the antenna, one or more of the following generation parameters sent by the base station, and transmits the one or more of the following generation parameters to the processor: a quantity of RUs in which the cell control reference information is located, a location of an RU in which the cell control reference information is located on a time-frequency resource, a value of N, a generation method of the cell control reference information, a mapping pattern of the cell control reference information on the RU, a pseudo-random sequence, a sub-band sequence number, and an index number of a generation parameter set. The processor updates the program or the mapping pattern stored in the memory based on the received parameter.

In a possible design, the memory is configured to store the generation parameters or the index number of a generation parameter set that includes these generation parameters.

In a possible design, the receiver is configured to receive the signals of different sub-bands in a same subframe.

According to technical solutions provided in the embodiments of the present invention, N antenna ports are used to send cell control reference information on one or more RUs. This may effectively control overheads, and resolve problems of array gains and a coverage area. Further, this may effectively control mutual interference of cell control reference information between cells. In addition, different time-frequency resource locations may be flexibly used to send the cell control reference information, so as to obtain frequency hopping gains.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
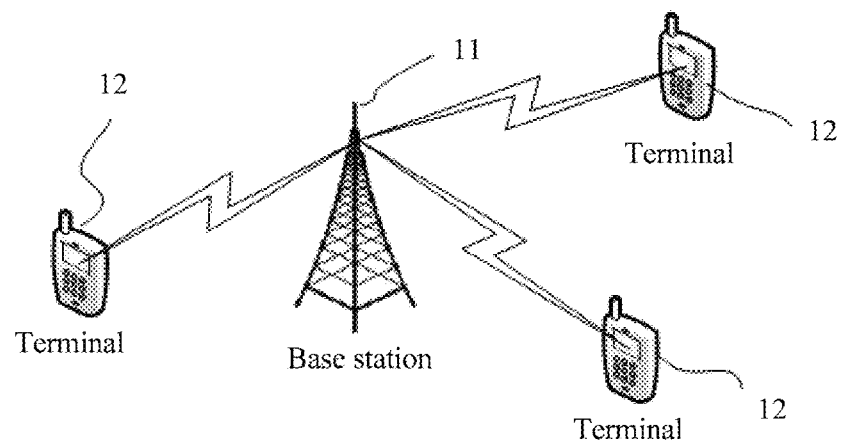
FIG. 1 is a schematic diagram of an LTE system in a typical LTE deployment scenario.
Figure 2:
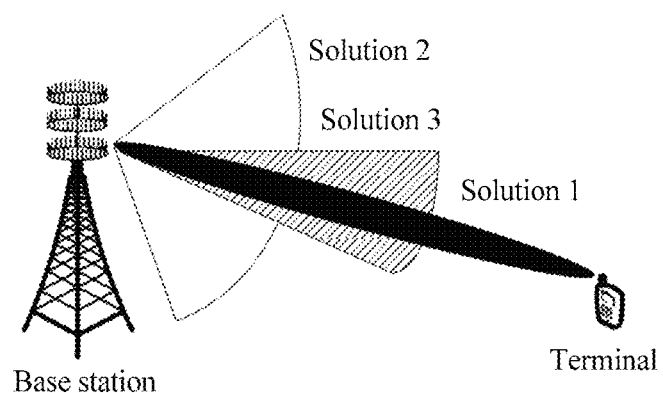
FIG. 2 is a schematic diagram of antenna port gains and a coverage area.

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The technical solutions of this application may be applied to various communications systems, such as LTE, LTE-Advanced, LTE-Advanced Pro, Wi-Fi, Worldwide Interoperability for Microwave Access (WiMAX), or WLAN Authentication and Privacy Infrastructure (WAPI), and a future communications system such as a 5G communications system or a communications system after 5G.

In an existing LTE pilot, a pilot specially used to detect common control information is only a CRS, and the UE estimates channel information of the common control information based on the CRS, and then demodulates the common control information based on the detected channel information. However, because the CRS is distributed on the full system bandwidth, a method in which a power spectrum density (PSD) is increased by using a narrow bandwidth beam cannot be used to enable all UEs within an entire coverage area to receive a pilot signal. Therefore, to demodulate common control information sent by using a high PSD, cell control reference information for a new common control signal needs to be designed. Without loss of generality, it is assumed that the cell control reference information is transmitted in a form of cell control reference signal (CCRS) by using the high PSD. It should be noted that, although a cell may not be used as a division unit in a future communications network, a change of the division method does not affect implementation of the solutions of this application. Therefore, a "cell" is still used as an example for description in this application. Based on this, a DMRS is used to implement coherent demodulation of a UE-specific signal (including a UE-specific signal data signal, a UE-specific control signal, and the like), and a CSI-RS is used to implement channel detection. In this way, a reference signal combination of a CCRS, a DMRS, and a CSI-RS may achieve a system optimization objective of overhead minimization and flexible configuration.

After M-MIMO is introduced, to resolve a contradiction of the M-MIMO that a range is limited when a narrow beam is used for transmission and it is difficult to reach a cell edge when a wide beam is used for transmission, a narrow bandwidth beam high PSD transmission solution may be used: mapping a control signal to some limited frequency resources Bc in system bandwidth Bt (Bc<Bt), defining the frequency resources as common control channels, and concentrating transmit power on spectrum resources occupied by these common control channels to obtain a higher PSD and increase a transmission distance; in addition, using the wide beam for transmission, so as to expand a width of a transmission range. Based on this solution, the transmit power is all concentrated on the common control channel. If all M antenna ports configured for a base station are used to transmit the common control information, all transmission resources are exhausted. Obviously, this is not proper. Therefore, in the embodiments of this application, N antenna ports are selected from the M antenna ports of the base station to transmit the common control information, where both M and N are positive integers, and N<M. During implementation, in the base station, a value of N may be preset and N antenna ports may be preset to transmit the common control information and the cell control reference information. In addition, based on at least one of the following parameters: channel statistics of all UEs within the coverage area, load, interference, a size of a coverage area of a base station, bandwidth supported by the base station, and transmit power of all antenna ports, the base station may determine a value of N or select N antenna ports from the M antenna ports configured for the base station. For example, the base station uses M=64 antenna ports to send and receive data. For a group of antenna ports that form a square matrix, correlation between two antenna ports on top of a diagonal is usually low. In this case, the two antenna ports on top of the diagonal are selected, that is, N=2. Certainly, the N antenna ports may alternatively be selected by calculating correlation between antenna ports in the foregoing M antenna ports, or may even be arbitrarily selected from the foregoing M antenna ports. A simple method is to directly use a quantity of antenna ports supported by the existing LTE, for example, N=1, 2, 4, or 8. Because the N antenna ports are specially used to send the common control information, a value of N should not be too large. If a value of N is too large, overheads of the CCRS are increased, and a quantity of antenna ports for sending a data signal is also affected. Consequently, data signal transmission is affected.

The base station having M antenna ports maps the common control information and the cell control reference information (without loss of generality, a CCRS sequence is used to indicate the cell control reference information in this application) used to detect the common control information to one or more resource units (RU) of the N antenna ports, and sends, when the common control information and the CCRS sequence need to be sent, the common control information and the CCRS sequence to a UE within the coverage area of the base station by using the one or more RUs. The UE also needs to generate, on a same time-frequency resource, the cell control reference information (or the CCRS sequence) that is consistent with that of the base station, and then detects the common control information from a received signal by using the CCRS sequence generated by the UE.

Figure 3:
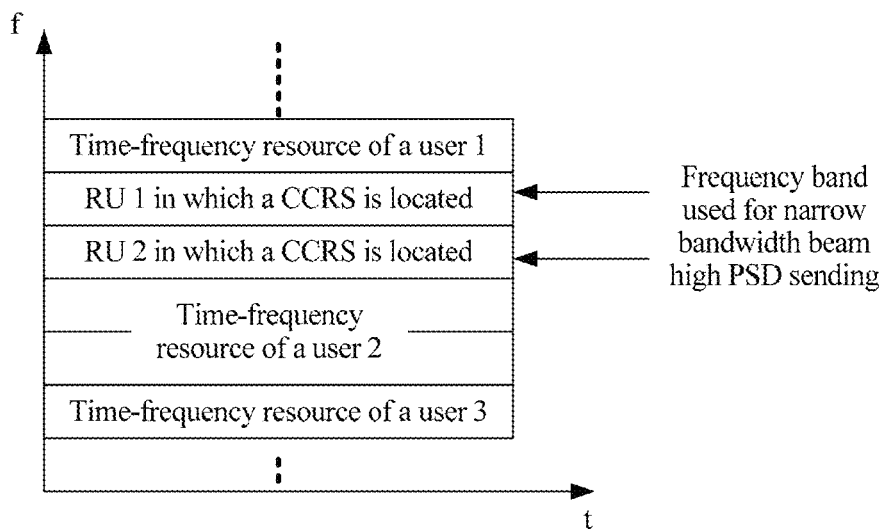
FIG. 3 is a schematic diagram of a time-frequency resource occupied by a CCRS sequence.

For example, the base station uses the N antenna ports to send the common control information by using the common control channel. The common control channel includes several basic time-frequency RUs, and the CCRS sequences used to detect the common control information are distributed on each RU in the common control channel (corresponding to the foregoing Bc). FIG. 3 is a schematic diagram of a CCRS sequence in frequency domain. A UE 1 occupies one RU; the common control channel of the CCRS sequence occupies two RUs; a UE 2 occupies two RUs; and a UE 3 occupies one RU. It can be learned that the CCRS sequences are distributed in a unit of RU on only a limited part of a frequency band, and does not occupy an entire system frequency band. This reflects the meaning of "narrowband" in this application. Other RUs are allocated to other UEs for UE-specific transmission. That is, the RU in which the CCRS sequence is located and the UE-specific RU are orthogonal and are not overlapping. After the CCRS sequence is introduced, the CRS may not be sent. Therefore, the N antenna ports send the common control information and the CCRS sequence only on the RU in which the CCRS sequence is located, and remaining (M−N) antenna ports send UE-specific data or other information on the other RUs. In this narrow bandwidth beam solution, some antenna ports and a part of bandwidth are used to send the common control information and the corresponding CCRS sequence, so as to resolve problems of both array gains and a coverage area. Certainly, this is only for transmission of the common control information.

It should be noted that an RU 1 and an RU 2 in which the CCRS sequence is located in FIG. 3 are continuously distributed, but actually may be discontinuously distributed, for example, the RU 2 in which the CCRS sequence is located is moved to the middle of a time-frequency resource of the UE 2 and a time-frequency resource of the UE 3.

Embodiment 1

A base station having M antenna ports generates, before common control information is sent, cell control reference information used to detect the common control information. In this embodiment, the cell control reference information used to detect the common control information is a CCRS sequence.

The base station maps the common control information and the cell control reference information to one or more resource units RUs of N antenna ports, and the common control information and the cell control reference information used to detect the common control information are sent to a UE within a coverage area of the base station by using the one or more RUs. The N antenna ports are some of the M antenna ports of the base station.

Figure 4:
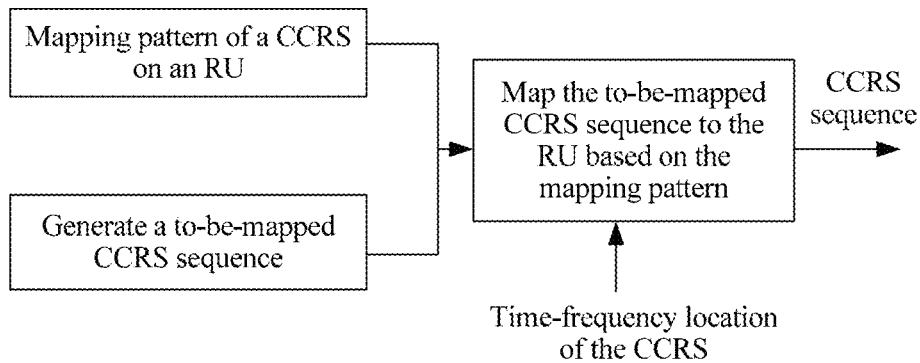
FIG. 4 is a schematic diagram of generating a CCRS sequence.

Before sending the common control information, the base station needs to generate the CCRS sequence used to detect the common control information. To ensure consistency with a CCRS sequence generated by the UE, the base station and the UE need to maintain a same parameter used to generate the CCRS sequence, a same rule used to generate the CCRS sequence, and a same rule (for example, a mapping pattern) used to map the CCRS sequence, so as to ensure that a same CCRS sequence is obtained. FIG. 4 shows a schematic flowchart of generating a CCRS sequence. It can be learned that after a mapping pattern of the CCRS sequence on an RU is determined and a to-be-mapped CCRS sequence is generated, and after the to-be-mapped CCRS sequence is mapped to a time-frequency resource corresponding to the CCRS sequence based on the mapping pattern, the to-be-mapped CCRS sequence is a CCRS sequence that is actually sent (or received). It should be noted that the flowchart is applicable to both the UE and the base station. The N antenna ports that send the common control information and the CCRS sequence, and information about a time-frequency location (including a quantity of RUs, a timeslot, and a frequency band of the CCRS sequence) of the CCRS sequence may be preset on the base station and the UE, or may be determined by the base station based on at least one parameter of factors such as channel statistics of all UEs within the coverage area, load, interference, a size of a coverage area of a base station, bandwidth supported by the base station, and transmit power of all antenna ports, and the UE within the coverage area is notified.

Design of the CCRS sequence includes three aspects: (1) A mapping pattern of the CCRS sequence is first designed on an RU; (2) A to-be-mapped CCRS sequence is generated; and (3) The to-be-mapped CCRS sequence is mapped to one or more RUs based on the mapping pattern, or some CCRS sequences are selected from the to-be-mapped CCRS sequences and mapped to one or more RUs. These aspects are described in detail below.

(1) A mapping pattern of the CCRS sequence is first designed on an RU.

Figure 5:
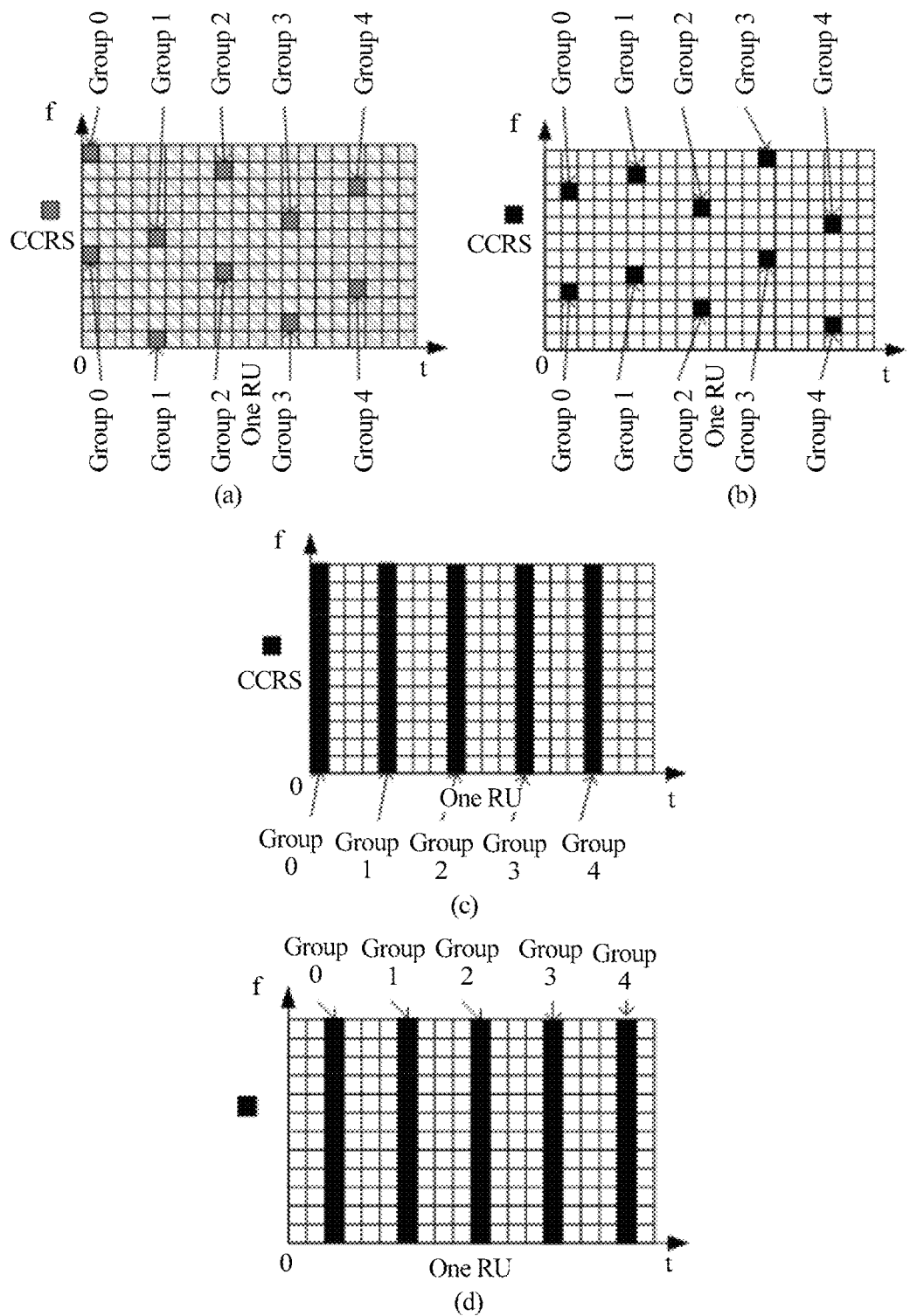
FIG. 5 is a schematic structural diagram of a CCRS sequence (a single antenna port and one RU)

The base station (or UE) maps the CCRS sequence to one RU (for example, the RU 1 in which the CCRS sequence is located in FIG. 3) of an antenna port in any one of manners in FIG. 5, where a horizontal axis direction represents time, and a vertical axis represents frequency.

In an LTE system, one RB is equal to 12 subcarriers × 14 symbols, that is, 12 subcarriers are occupied in frequency domain, and 14 symbols are occupied in time domain. In FIG. 5, a size of an RU is L=12 subcarriers in frequency domain, and J=20 symbols are occupied in time domain. It can be learned that a size of an RU sent by using a narrow bandwidth beam high PSD method may be inconsistent with the size of the RB defined in LTE. This is not limited herein. However, it is usually recommended that the RU is consistent with the RB at least in frequency domain, that is, 12 subcarriers, and a quantity of symbols in time domain is determined based on an amount of to-be-transmitted common control information. Certainly, in consideration of backward compatibility, the size of the RU is still consistent with the size of the RB of the LTE as much as possible, that is, the 12 subcarriers×14 symbols.

Mapping patterns of CCRS sequence symbols on each RU on a time-frequency resource may be mutually independent. The mapping pattern may be related to one or more of the following generation parameters: port numbers of the N antenna ports, a specific quantity of RUs in which the CCRS sequence is located, a quantity of subcarriers occupied in any one of the RUs in which the CCRS sequence is located, a quantity of REs occupied in the RUs in which the CCRS sequence is located, an identity(ID) of a cell in which the base station or the UE is located, time-frequency information (including but not limited to a frame sequence number, a subframe sequence number, a symbol sequence number in a subframe, a subcarrier sequence number, a sequence number of the RU in which the CCRS sequence is located, and a sub-band sequence number) when the base station sends the common control information and the CCRS sequence (that is, a time when the UE receives the common control information and the CCRS sequence, and the following is the same), and a quantity of subcarriers occupied in any RU in which the CCRS sequence is located. In particular, with the development of technologies and network evolution, a concept of a cell has been gradually weakened, and connotation of a cell ID is gradually changing, and sometimes is represented by using a transmission point (TP) ID. That is, the UE is more concerned about the following: communication is performed on which base station or transmission point instead of which cell. A conventional cell ID is still used in this application. However, it should be noted that in the solutions in which the cell ID is used in all embodiments including this embodiment in this application, the TPID may alternatively be used.

Figure 6:
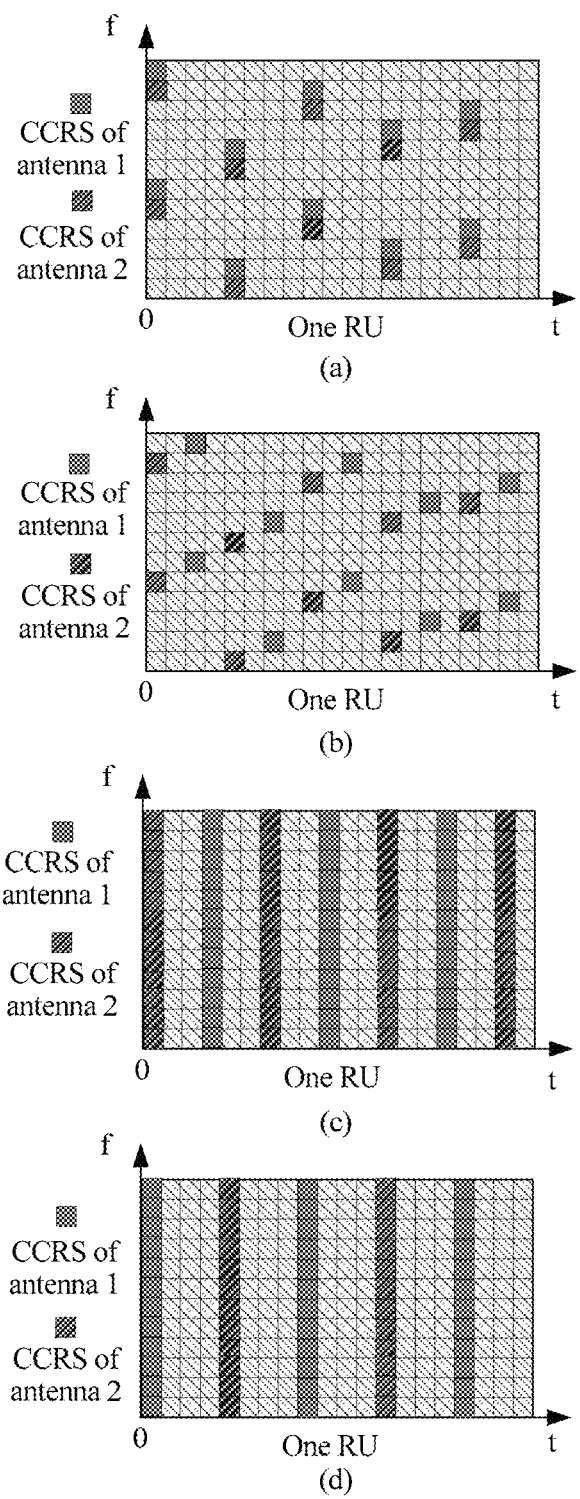
FIG. 6 is a schematic structural diagram of a CCRS sequence (dual antenna ports and one RU)

In examples of mapping patterns shown in FIG. 5 and FIG. 6, the mapping patterns may be determined based on one or more of the following parameters: a subcarrier sequence number used to send the CCRS sequence, a quantity of subcarriers occupied by the CCRS sequence in any RU in which the CCRS sequence is located, a quantity of subcarriers on any RU in which the CCRS sequence is located, a quantity of RUs in which the CCRS sequence is located, a symbol sequence number in one subframe, time-frequency information (including but not limited to a frame sequence number, a subframe sequence number, a symbol sequence number in a subframe, a subcarrier sequence number, a sequence number of the RU in which the CCRS sequence is located, and a sub-band sequence number) when the CCRS sequence is sent, an antenna port number used to send the CCRS sequence, and an ID of a cell in which the base station or the UE is located.

The RU in which the CCRS sequence is located may occupy L subcarriers in frequency domain, and occupy J symbols in time domain. FIG. 5a is used as an example. In FIG. 5a, the RU in which the CCRS sequence is located occupies 12 subcarriers in frequency domain, and occupies 20 symbols in time domain. In this case, in consideration of both reference signal overheads and channel detection precision, five groups (selection of a specific quantity of groups is not discussed in this application, and this is merely an example herein) of reference signals may be placed in time domain. Symbols of each group of reference signals in time domain of an RU are symbol 0, symbol J/5, symbol 2J/5, symbol 3J/5, and symbol 4J/5, that is, symbol 0, symbol 4, symbol 8, symbol 12, and symbol 16, which are respectively corresponding to group 0 of reference signals, group 1 of reference signals, group 2 of reference signals, group 3 of reference signals, and group 4 of reference signals. Two reference signal points are placed in each symbol with a reference signal at different locations in frequency domain. In FIG. 5a, spacing between two reference signal points on a same symbol is (L/2−1) (that is, five) subcarriers in frequency domain, that is, if the first reference signal point is on subcarrier x, the second reference signal point is on subcarrier (mod (x+L/2, L)) or subcarrier (mod (x−L/2, L)), that is, a difference between subcarrier numbers is L/2. Herein, mod indicates a modulo operation. However, in time domain, reference signals whose group number is even are successively staggered by one subcarrier from top to bottom, and reference signals whose group number is odd are successively staggered by one subcarrier from bottom to top. An even group is used as an example. It is assumed that 12 subcarriers in frequency domain are numbered 0 to 11. As shown in FIG. 5a, group 0 of reference signals is mapped to subcarrier 11 and subcarrier 5, group 2 of reference signals is mapped to subcarrier 10 and subcarrier 4, group 4 of reference signals is mapped to subcarrier 9 and subcarrier 3, group 1 of reference signals is mapped to subcarrier 6 and subcarrier 0, and group 3 of reference signals is mapped to subcarrier 7 and subcarrier 1. For another RU, this mapping method may be completely copied, or a specific quantity of subcarriers in frequency domain and/or a specific quantity of symbols in time domain may be correspondingly offset based on a subframe sequence number, a pseudo-random sequence, a sub-band sequence number, an RU sequence number, and an antenna port number according to a set rule.

If J is relatively large, for example, greater than 30, more symbols may be used to carry reference signals. If J is relatively small, fewer symbols may be used to carry reference signals. Based on an empirical value, usually, in consideration of both reference signal overheads and channel detection precision, spacing between two symbols with reference signals being not more than four symbols is proper. If L is relatively large, for example, greater than 20, increasing a quantity of reference signal points on each symbol with reference signals may be considered. Usually, spacing between two reference signal points should not exceed 10 subcarriers. However, a principle for mapping a reference signal remains unchanged.

A similar principle is used in FIG. 5b to map the CCRS sequence to the time-frequency resource. Pilot location time domain intervals between groups in FIG. 5b are the same as those in FIG. 5a, but a location relationship between the groups in frequency domain changes. FIG. 5a and FIG. 5b may be separately used in neighboring cells, so as to ensure that CCRS sequences in FIG. 5a and FIG. 5b can be mutually orthogonal without mutual interference even if a same frequency band is used.

In FIG. 5c, a time division multiplexing (TDD) manner with the common control information in a common control channel in time domain by the CCRS sequence is used, that is, in a symbol in which the CCRS sequence is located, the CCRS sequence occupies bandwidth of an entire control channel. It is not difficult to imagine that a manner of performing frequency division multiplexing (FDD) on the CCRS sequence and the common control information may also be used; for example, a simple method is to interchange a horizontal coordinate and a vertical coordinate in FIG. 5c, that is, the horizontal coordinate is changed to frequency, and the vertical coordinate is changed to time (a size of an RU is changed to 20 subcarriers multiplied by 12 symbols).

FIG. 5d is similar to FIG. 5c. A difference lies in that a start position of a CCRS sequence symbol is not in a start position of a frame structure, but in the middle.

A quantity of antenna ports used to transmit the common control channel is limited. Therefore, although the CCRS sequences of different antenna ports can also be distinguished in a CDM manner, in consideration of increased complexity of channel detection, preferably, the FDM or TDM manner is used to correspond to the CCRS sequences of different antenna ports, so that orthogonality is ensured. Certainly, the CDM manner is not excluded.

FIG. 6 shows several possible examples of CCRS sequence mapping patterns when there are two antenna ports (that is, N=2).

In an example of FIG. 6a, an FDM manner is used between two antenna ports. A pattern of FIG. 6a is similar to that of FIG. 5a. An RU size is consistent with that in FIG. 5. CCRS sequences of the two antenna ports are staggered in frequency domain to ensure orthogonality. Alternatively, a TDM manner may be used, that is, CCRS sequences of the two antenna ports occupy two adjacent symbols on a same subcarrier, and orthogonality is also ensured. A similar method may also be used when N is another value.

In an example of FIG. 6b, groups of CCRS sequences of two antenna ports are in both the FDM manner and the TDM manner.

In an example of FIG. 6c, the TDM manner is used between CCRS sequences of two antenna ports and between the CCRS sequence and the common control information. Likewise, this pattern may be extended to the FDM manner. Similar to FIG. 5c, a simple method is to interchange a horizontal coordinate with a vertical coordinate in FIG. 6c, that is, the horizontal coordinate is changed to frequency, and the vertical coordinate is changed to time (a size of an RU is changed to 20 subcarriers multiplied by 12 symbols).

An example of FIG. 6d is similar to that of FIG. 6c, but a density of a CCRS sequence is reduced.

It should be noted that only an example in which there is a single cell is provided in FIG. 5 and FIG. 6, and only CCRS sequence orthogonal transmission needs to be maintained between different cells or transmit points.

(2) A to-be-mapped CCRS sequence is generated.

The base station generates, before the common control information needs to be sent, the cell control reference information (for example, the to-be-mapped CCRS sequence) used to detect the common control information.

Before receiving a signal sent by the base station on one or more RUs of the N antenna ports, the UE generates the cell control reference information (for example, a to-be-mapped cell control reference signal sequence) used to detect the common control information, and then the UE may obtain, based on the cell control reference information generated by the UE, the common control information from the signal sent by the base station.

The base station (or UE) may generate the to-be-mapped cell control reference signal sequence based on an existing LTE protocol, or based on one or more of the following generation parameters: a pseudo-random sequence, an antenna port number used to send the CCRS sequence, a specific quantity of RUs in which the CCRS sequence is located, a quantity of subcarriers occupied in any one of the RUs occupied by the CCRS sequence, a quantity of REs occupied in any one of the RUs occupied by the CCRS sequence, an ID of a cell in which the base station or the UE is located, time-frequency information (including but not limited to a frame sequence number, a subframe sequence number, a symbol sequence number in a subframe, a sub-carrier sequence number, sequence numbers of the one or more RUs, and a sub-band sequence number) when the CCRS sequence is sent, and a quantity of subcarriers occupied by the CCRS sequence in any occupied RU.

Specifically, there are a plurality of generation modes for generating the to-be-mapped CCRS sequence.

The following uses an example in which the base station or the UE generates the to-be-mapped CCRS sequence based on the pseudo-random sequence for description. An advantage of using the pseudo-random sequence is that there is usually relatively good orthogonality between the pseudo-random sequences. In this case, even if a collision occurs on time-frequency resources for cell control reference information of neighboring cells, a relatively good detection feature can be ensured.

Generation mode 1: A conventional approach is to refer to an existing generation method of resources occupied by the CRS on a full frequency band, but a difference lies in that the to-be-mapped CCRS sequence is generated based on only resources occupied by the CCRS sequence on the common control channel in this application. Therefore, a definition form of the CCRS sequence needs to be changed as follows:

$$r_{l,n_s,p_1,p_2,p_3}(m) = \frac{1}{\sqrt{2}}(1-2c(2m)) + j\frac{1}{\sqrt{2}}(1-2c(2m+1)), \quad (1)$$

where j is an imaginary number symbol;

r represents the to-be-mapped CCRS sequence;

m is a subcarrier sequence number of the RU in which the CCRS sequence is located, and m=0, 1, . . . , and $xN_{RU}^{CCRS,DL}-1$;

represents a quantity of subcarriers occupied by the CCRS sequence in one RU;

$N_{RU}^{CCRS,DL}$ represents a quantity of RUs occupied by a common control channel on which the CCRS sequence is located;

l is an OFDM symbol sequence number of the CCRS in a subframe when the CCRS sequence is sent; and c(m) is a pseudo-random sequence (which may be a Gold sequence, an m sequence, a Zadoff-Chu sequence, or the like), and is initialized in the following manner:

$c_{init}=f(l,n_s,p_1,p_2,p_3,N_{ID}^{cell})$, where $f$ represents a function, for example, the $f$ function may be:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3 \quad (2), \text{where}$$

c(0) is an initial value $c_{init}$ of the pseudo-random sequence; $n_s$ is a subframe sequence number; $p_1$ is a sequence number of the RU; $p_2$ is an antenna port number; $p_3$ is a frame sequence number; $\alpha_1$, $\alpha_2$, and $\alpha_3$ are corresponding coefficients; and $N_{ID}^{cell}$ is an ID of a cell in which the base station or the UE is located, and represents that a multi-cell impact is considered in the generation manner. If it is determined that the generation manner is unrelated to a generation parameter, the generation parameter in the function only needs to be set to a constant. For example, when the CCRS sequence is related to only the symbol sequence number and is unrelated to the subframe, $n_s$ may be set to 1, or a coefficient of $n_s$ is defined as 0. For example, in the solution in which N=1, that is, there is a single antenna port, the following may be defined: $\alpha_2=0$. For another example, if it is determined that c(m) is unrelated to the ID of the cell, $N_{ID}^{cell}$ may be defined as 0 or any other constant. Certainly, another generation mode may be defined, or $p_1$, $p_2$, $p_3$ are defined as other parameters.

Generation mode 2: The to-be-mapped CCRS sequence is generated by using a total quantity of all resources of the common control channel. A definition form is as follows:

$$r_{l,n_s,p_1,p_2,p_3}(m) = \frac{1}{\sqrt{2}}(1-2c(2m)) + j\frac{1}{\sqrt{2}}(1-2c(2m+1)) \quad (3)$$

It may be learned that the form of the CCRS sequence is the same as that in generation mode 1, but parameter definitions or value ranges in the form are different. j is an imaginary number symbol, and c(m) is a pseudo-random sequence;

r represents the to-be-mapped CCRS sequence;

m is a subcarrier sequence number, and m=0, 1, . . . , and $xN_{RU}^{CCRS,DL}-1$;

x represents a quantity of subcarriers on one RU, and is not a quantity of subcarriers occupied by the CCRS sequence in one RU in generation mode 1, and this is different from formula represents a quantity of RUs occupied by a common control channel on which the CCRS sequence is located;

l is an OFDM symbol sequence number of the CCRS in a subframe when the CCRS sequence is sent, and c(m) is a pseudo-random sequence and is initialized in the following manner:

$c_{init}=f(l,n_s,p_1,p_2,p_3,N_{ID}^{cell})$, where $f$ represents a function, for example, the $f$ function may be:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3 \quad (4), \text{where}$$

c(0) is an initial value $c_{init}$ of the pseudo-random sequence; $n_s$ is a subframe sequence number; $p_1$ is a sequence number of the RU; $p_2$ is an antenna port number; $p_3$ is a frame sequence number; $\alpha_1$, $\alpha_2$, and $\alpha_3$ are corresponding coefficients; and $N_{ID}^{cell}$ is an ID of a cell in which the base station or the UE is located, and represents that a multi-cell impact is considered in the generation manner. If it is determined that the generation manner is unrelated to a generation parameter, the generation parameter in the function only needs to be set to a constant. For example, when the CCRS sequence is related to only the symbol sequence number and is unrelated to the subframe, $n_s$ may be set to 1, or a coefficient of $n_s$ is defined as 0. For example, in the solution in which N=1, that is, there is a single antenna port, the following may be defined: $\alpha_2=0$. Certainly, another generation mode may be defined, or $p_1$, $p_2$, $p_3$ are defined as other parameters.

The foregoing to-be-mapped CCRS sequence generated $r_{l,n_s,p}(m)$ based on generation mode 1 or generation mode 2 is mapped to a complex value modulation symbol for use as a reference signal of the current OFDM symbol:

$$a_{k,l,n_s}^{(p)} = r_{l,n_s,p}(m') \quad (5), \text{ where}$$

k represents a subcarrier sequence number of a mapping location of the CCRS sequence; and m'=f(m) indicates that a subsequence is selected from the sequence $r_{l,n_s,p}(m)$ for mapping.

Generation mode 3: One or a group of pseudo-random sequences (for example, a Gold sequence, an m sequence, a ZC sequence, or the like) is directly generated for use as the to-be-mapped CCRS sequence.

(3) The to-be-mapped CCRS sequence is mapped to the time-frequency resource based on the preset mapping pattern, that is, one or more resource units RUs of the N antenna ports. For example, the base station (or UE) may map all or some to-be-mapped cell control reference signal sequences to the one or more RUs of the N antenna ports based on one of the following parameters: a quantity of all resource elements of the one or more RUs, a quantity of all resource elements used to send the cell control reference information in the one or more RUs, a quantity of all resource elements used to send the cell control reference information in any one of the one or more RUs, and a quantity of resource elements occupied by any one of the one or more RUs. The following uses a specific example for description.

After the base station (or UE) generates the to-be-mapped CCRS sequence, the to-be-mapped CCRS sequence may be mapped to the time-frequency resource based on the mapping pattern in a plurality of manners. For example, as shown in FIG. 3 and FIG. 5a, the CCRS sequence occupies $Q_{RE\_CCRS\ sequence}=10$ REs in each RU. Each RU includes a total of 240 REs. The CCRS sequence is distributed in two RUs. In this case, the CCRS sequence occupies a total of 20 REs on two RUs, and two RUs include a total of 480 REs. If the foregoing modes are used to generate the to-be-mapped CCRS sequence, the manner in which the base station maps the to-be-mapped CCRS sequence to the time-frequency resource includes but is not limited to the following manners. It should be noted that when a length (that is, similar to a quantity of complex value modulation symbols in formula (5)) of the to-be-mapped CCRS sequence is greater than a quantity of to-be-mapped time-frequency resources REs, only some to-be-mapped CCRSs need to be selected based on the quantity of to-be-mapped REs in each manner.

Manner 1: Mapping is performed based on a quantity of REs occupied by the CCRS sequence in all RUs when the base station sends (or the UE receives) the CCRS sequence. For example, if the CCRS sequence occupies a total of 20 REs on two RUs, some to-be-mapped CCRSs are selected based on a total quantity of REs of the CCRS sequence, that is, $Q_{RE\_CCRS\_total}=20$. When the to-be-mapped CCRS sequence is directly generated by using the Gold sequence, $Q_{RE\_CCRS\_total}$ symbols may be truncated from the Gold sequence whose length exceeds $Q_{RE\_CCRS\_total}$ for use as the CCRS sequence. When the to-be-mapped CCRS sequence is generated by using formula (1), a value of $N_{RU}^{CCRS,DL}$ in the formula may be set to 2 to obtain the to-be-mapped CCRS sequence, and then the to-be-mapped CCRS sequence is mapped to the time-frequency resource according to formula (5).

Manner 2: Mapping is performed based on a total quantity of REs on an RU in which the CCRS sequence is located when the base station sends (or the UE receives) the CCRS sequence. For example, if two RUs in which the CCRS sequence is located occupy a total of 480 REs, some to-be-mapped CCRSs are selected based on a total quantity of REs of the RU in which the CCRS sequence is located, that is, $Q_{RE\_RU\_total}=480$ REs. When the to-be-mapped CCRS sequence is directly generated by using the Gold sequence, $Q_{RE\_CCRS}$ symbols may be successively truncated from each RU based on a sequence of an RU in the Gold sequence whose length exceeds $Q_{RE\_RU\_total}$ for use as the CCRS sequence. When the to-be-mapped CCRS sequence is generated by using formula (3), a value of $N_{RU}^{CCRS,DL}$ in the formula may be set to 2 to obtain the to-be-mapped CCRS sequence, and then the to-be-mapped CCRS sequence is mapped to the time-frequency resource according to formula (5).

Manner 3: Mapping is performed based on a quantity of REs occupied by the CCRS sequence in each RU when the base station sends (or the UE receives) the CCRS sequence. For example, if the CCRS sequence in each RU occupies $Q_{RE\_CCRS}=20$ REs, when the to-be-mapped CCRS sequence is directly generated by using the Gold sequence, $Q_{RE\_CCRS}$ symbols may be truncated from the Gold sequence whose length exceeds $Q_{RE\_CCRS}$ for use as the CCRS sequence. When the to-be-mapped CCRS sequence is generated by using formula (1), a value of $N_{RU}^{CCRS,DL}$ in the formula may be set to 1 to obtain the to-be-mapped CCRS sequence, and then the to-be-mapped CCRS sequence is mapped to the time-frequency resource according to formula (5).

Manner 4 is similar to Manner 3, but an RU 1 and an RU 2 use a same Gold sequence or use a same $p_1$ in formula (1), that is, regardless of an RU sequence number.

Manner 5: Mapping is performed based on a total quantity of REs occupied in any one of RUs in which the CCRS sequence is located when the base station sends (or the UE receives) the CCRS sequence. For example, if each RU which the CCRS sequence is located occupies $Q_{RE\_RU}=240$ REs, some to-be-mapped CCRSs are selected based on a total quantity of REs of each RU in which the CCRS sequence is located, that is, $Q_{RE\_RU}=240$. When the to-be-mapped CCRS sequence is directly generated by using the Gold sequence, $Q_{RE\_CCRS}$ symbols may be successively truncated from each RU based on a sequence of an RU in the Gold sequence whose length exceeds $Q_{RE\_RU}$ for use as the CCRS sequence. When the to-be-mapped CCRS sequence is generated by using formula (3), a value of $N_{RU}^{CCRS,DL}$ in the formula may be set to 1 to obtain the to-be-mapped CCRS sequence, and then the to-be-mapped CCRS sequence is mapped to the time-frequency resource according to formula (5).

Manner 6 is similar to Manner 5, but an RU 1 and an RU 2 use a same Gold sequence or use a same $p_1$ in formula (3), that is, regardless of an RU sequence number.

It should be noted that only an example in which there is a single antenna port is used herein, and another enumerated quantity is also an example. Certainly, a specific quantity needs to be determined based on factors such as an actual size of an RU, a quantity of RUs occupied by the common control channel, a quantity of antenna ports, and a sequence number of an antenna port. For example, for an example in which there are two antenna ports in FIG. 6, a quantity $Q_{RE\_CCRS}$ of REs occupied by the CCRS sequence in each RU in Manner 1, Manner 3, and Manner 4 is doubled, that is, an available length of the Gold sequence is doubled.

A manner in which each selected RU independently generates a pseudo-random sequence (a sequence in each generation mode) and independently maps a CCRS sequence symbol can be easily extended, so that a length of the pseudo-random sequence and a mapping manner are not limited by a size of a physical channel resource block.

As described above, to generate a same CCRS sequence, the base station and the UE need to maintain a same parameter used to generate the CCRS sequence, a same generation rule used to generate the CCRS sequence, and a same mapping rule (for example, a mapping pattern) used to map the CCRS sequence, so as to ensure that a same CCRS sequence is obtained. Specifically, the following several manners may be used to ensure that the base station and the UE have the same parameter used to generate the CCRS sequence, the same generation rule used to generate the CCRS sequence, and the same mapping rule used to map the CCRS sequence. Examples are given below.

(1) A parameter used to generate the CCRS sequence, a generation rule used to generate the CCRS sequence, and a mapping rule used to map the CCRS sequence are preset on the base station and the UE. The base station and the UE jointly maintain an agreed value of N, a size of RU, a quantity of RUs, and a sending timeslot that are occupied by a control channel and the CCRS sequence, a sending frequency band, a mapping pattern and a generation method of the CCRS sequence, and the like. That is, according to an agreed resource mapping rule, the base station sends, by using an agreed quantity of antenna ports, common control information and an agreed CCRS sequence in an agreed timeslot on an agreed frequency band.

For example, the following table is stored in both the base station and the UE.

TABLE 1

CCRS sequence generation parameters table

| Sequence Number | Generation Parameter | Value |
|---|---|---|
| 1 | N | 1 |
| 2 | A timeslot of a CCRS sequence | An even-numbered subframe of each frame. Subframe numbers start from 0, that is subframe #0, subframe #2, . . . |
| 3 | A quantity of RUs for sending the CCRS sequence | 2 |
| 4 | A frequency band of the CCRS sequence | A frequency band location of the CCRS sequence is consistent with that of a synchronization sequence: An RU in a middle position is occupied. |
| 5 | A pattern of the CCRS sequence | A pattern in FIG. 5a |
| 6 | A to-be-mapped CCRS sequence | Generation mode 1 |
| 7 | A value of the CCRS sequence | Manner 4: Each RU takes a same CCRS sequence. |

Table 1 is merely an example. In actual application, a quantity of generation parameters and a value of each generation parameter in the table may be changed as needed.

On an even subframe of each frame, the base station sends, on two RUs in the middle of the frequency band in which the synchronization sequence is located by using N=1 antenna port, the CCRS sequence obtained in generation mode 1 based on the pattern in FIG. 5a. The base station does not need to notify the UE in advance, because the UE already knows the information about these generation parameters in Table 1 before accessing the base station.

Therefore, the UE obtains, based on N=1, the CCRS sequence in generation mode 1 based on the pattern in FIG. 5a, and on an even subframe of each frame, detects, on two RUs in the middle of the frequency band in which the synchronization sequence is located, the CCRS sequence in an RU in which the CCRS sequence is located in a manner of N=1 after synchronizing with the base station.

(2) Some of the parameter used to generate the CCRS sequence, the generation rule used to generate the CCRS sequence, and the mapping rule used to map the CCRS sequence are pre-stored in the base station and the UE, and some are notified to the UE by using the base station.

For example, in the generation parameters shown in Table 1, the base station and the UE agree to store all the generation parameters except the quantity of RUs for sending the CCRS sequence, that is, only the quantity of RUs is not determined. In this case, the base station needs to broadcast only the quantity of RUs. Alternatively, although the base station and the UE have agreed to store all the generation parameters, some generation parameters need to be temporarily adjusted; for example, after the quantity of RUs is adjusted, the quantity of RUs may be directly broadcast.

Alternatively, the base station and the UE agree on several modes to jointly store a plurality of mode tables, and seven generation parameters shown in Table 1 are specified in each mode. The base station only needs to find an index number corresponding to a selected mode number based on a selected generation parameter, and broadcast the index number.

(3) The base station broadcasts, to the UE, the parameter used to generate the CCRS sequence, the generation rule used to generate the CCRS sequence, and the mapping rule used to map the CCRS sequence. In this manner, a broadcast volume is relatively large. This manner is usually not used. Therefore, details are not described again.

Correspondingly, on a UE side, the generation parameters shown in Table 1 may be obtained in a plurality of manners. The generation parameters may be determined based on a pre-stored table, or based on a pre-stored table and signaling received from the base station, or based on a mode corresponding to a received index number, or based on signaling received from the base station. The CCRS sequence and a timeslot that transmits the common control information and the CCRS sequence may be determined. In the timeslot, first, a CCRS sequence signal is received at a corresponding time-frequency resource location based on the mapping manner and the mapping pattern of the CCRS sequence on the time-frequency resources, and then a channel of a CCRS sequence location is estimated based on the CCRS sequence by using a channel estimation algorithm such as minimum mean square error(MMSE), zero forcing(ZF), and least square(LS), and a channel for transmitting the common control information is estimated in a manner of time domain interpolation, frequency domain interpolation, linear fitting, and the like, so that the common control information of this part is detected.

After this method is used, only the N antenna ports (N<M) are required to send the CCRS sequence, and the CCRS sequence does not need to be dispersed in an entire system frequency band and only needs to be distributed on partial frequency band occupied by the common control channel. Therefore, the N antenna ports may concentrate power on a frequency band of a common control channel, and ensure coverage in a narrow bandwidth beam high PSD sending mode. In addition, compared with the CRS dispersed in the entire system frequency band, the CCRS sequence greatly reduces pilot overheads.

Embodiment 2

Figure 7:
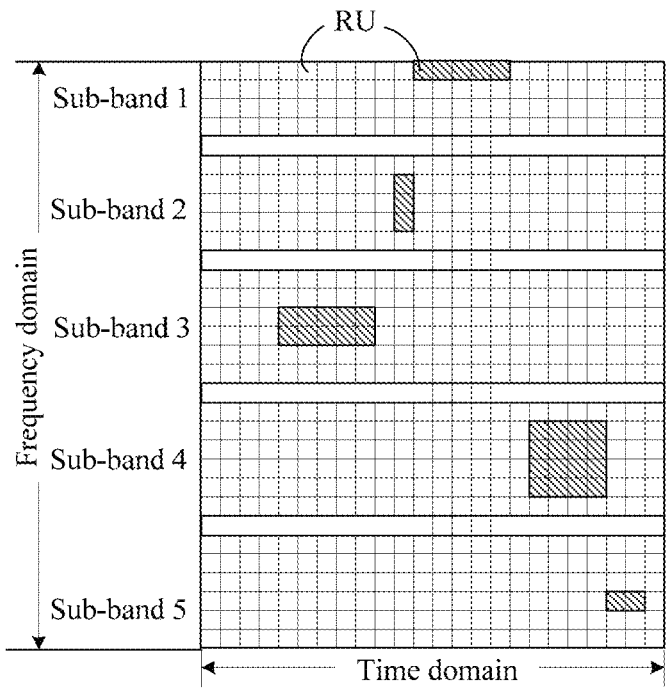
FIG. 7 is a schematic diagram of a location of a CCRS sequence resource.

In the CCRS sequence solution shown in Embodiment 1, only one common control channel is discussed, that is, there is only one CCRS sequence frequency band in an entire frequency band. When transmission bandwidth of a base station is relatively high, for example, a bandwidth of 200 MHz, the base station may divide the full bandwidth into a plurality of sub-bands with 20 MHz or lower bandwidth. Alternatively, a system includes a plurality of carriers with a bandwidth of 20 MHz (without loss of generality, in the following, a plurality of sub-bands are used to indicate a plurality of carriers with a bandwidth of 20 MHz included in the system), and the base station may be designed to send the common control channel in the plurality of sub-bands. As shown in FIG. 7, the common control channels are distributed on time-frequency resources of different sub-bands of one frame. Each space represents one RU, and an obliquely shadowed part refers to resources occupied by the common control channel. It can be learned that the sub-bands can independently schedule and transmit the resources of these common control channels, including generation parameters such as a quantity of RUs, a mapping manner, a mapping pattern, and even a quantity of antenna ports. In addition, a quantity of UEs that simultaneously schedule services varies, and sizes of the resources of these common control channels in the sub-bands may also vary. For example, as shown in FIG. 7, a sub-band 1 occupies only one RU in frequency domain, but occupies five consecutive RUs in time domain; a sub-band 2 occupies three consecutive RUs in frequency domain, but occupies one RU in time domain; a sub-band 3 occupies two RUs in frequency domain, but occupies five consecutive RUs in time domain; a sub-band 4 occupies four consecutive RUs in frequency domain, but occupies four consecutive RUs in time domain; and a sub-band 5 occupies only one RU in frequency domain, but occupies two consecutive RUs in time domain. There is even no common control channel on some sub-bands. Correspondingly, the CCRS sequences are dispersed over time-frequency resources corresponding to a plurality of common control channels, that is, the CCRS sequence is mapped only to a corresponding time-frequency resource in the obliquely shadowed part. Preferably, all sub-bands select same N antenna ports to send common control channel of the sub-bands. It should be noted that although the resources of the common control channels of the sub-bands and cell control reference information in FIG. 7 do not overlap in time domain, actually this is not limited. Resources of common control channels of different sub-bands may be simultaneously used for sending. Antenna ports used to send the common control channel selected by different sub-bands may be consistent or may be inconsistent, provided that the common control channels that are simultaneously sent can meet a coverage requirement and total bandwidth is lower than bandwidth of an entire system, that is, narrow bandwidth is used. With such flexible configuration, different time-frequency resource locations may be flexibly used for sending, so as to obtain frequency hopping gains.

Design of the CCRS sequence herein also includes three aspects: (1) a mapping pattern of the CCRS sequence on the time-frequency resource; (2) generation of a to-be-mapped CCRS sequence; and (3) mapping of the to-be-mapped CCRS sequence to the time-frequency resource based on the mapping pattern to generate the CCRS sequence. These aspects are similar to the methods used in the three aspects listed in Embodiment 1, and a difference is that a new generation parameter is introduced herein: a sequence number of a sub-band or carrier in which the CCRS sequence is located. However, it should be noted that formula (1), formula (3), formula (5), $Q_{RE\_CCRS\_total}$, and $Q_{RE\_RU\_total}$ may be independently calculated based on each sub-band, or may be calculated based on a sum of resources occupied by CCRS sequences of all sub-bands and a sum of resources of all RUs in which the CCRS sequence is located. Alternatively, completely same CCRS sequence design may be used on all the sub-bands. Because generation principles are the same, it can be considered that only one dimension, that is, the sub-band sequence number, is added to a process of designing the generation parameter, the mapping manner, the mapping pattern, and the like in Embodiment 1. For example, when a pseudo-random sequence is initialized by using formula (2) and formula (4), an addend '$+\alpha_4 p_4$' is added to a right side of the equation, where $\alpha_4$ is a coefficient, and $p_4$ is the sub-band sequence number. A method is similar to that for adding $p_1$, $p_2$, and $p_3$, and therefore is not described herein again.

Embodiment 3

Figure 8:
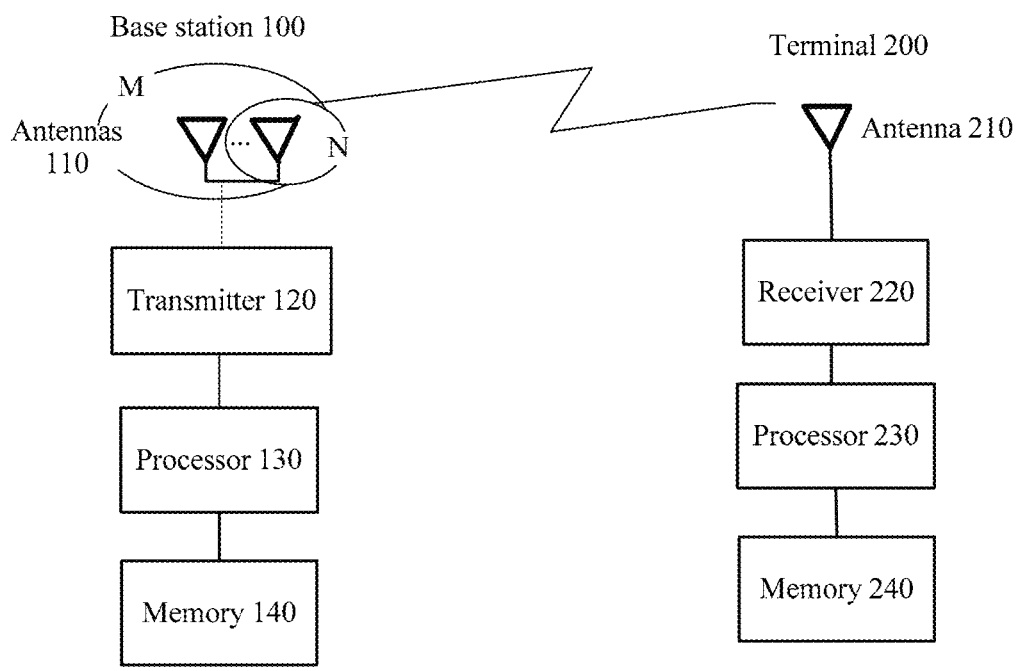
FIG. 8 is a structural block diagram of a base station and a UE that are used for communication.

FIG. 8 provides a structural block diagram of apparatuses that send and receive cell control reference information according to the foregoing embodiments. For ease of description, only a part related to this embodiment of this application is shown. In addition, in this embodiment, the apparatus may be a base station, or may be a UE.

In the apparatus, a base station 100 includes: an antenna 110, a transmitter 120, a processor 130, and a memory 140. The antenna 110 includes M antenna ports, and N of the M antenna ports are specially used to send common control information and a CCRS sequence used to detect the common control information.

The transmitter 120 is configured to send, by using one or more RUs and the N antenna ports, the common control information and the CCRS sequence to a UE within a coverage area of the base station.

The memory 140 is configured to store a mapping pattern, program code that can be executed by the processor 130, and a pseudo-random sequence.

The processor 130 is configured to: generate, based on the program code stored in the memory and the pseudo-random sequence, a to-be-mapped CCRS sequence; and map the to-be-mapped CCRS sequence to the one or more RUs of the N antenna ports. For how to design a mapping pattern of the CCRS sequence on an RU, how to generate a generation manner of the to-be-mapped CCRS sequence, and how to map the to-be-mapped CCRS sequence to the one or more RUs of the N antenna ports, refer to the description in the foregoing method embodiments. Details are not described herein again.

A value of N may be preset. Alternatively, the processor 130 may determine a value of N based on at least one parameter of factors such as channel statistics of all UEs within the coverage area of the base station, load of the base station, interference (including inter-cell interference and intra-cell interference), a size of a coverage area of a base station, bandwidth supported by the base station, and transmit power of all antenna ports.

The memory 140 may further store information about the N antenna ports; or the processor 130 may be further configured to select the N antenna ports from the M antenna ports.

If the UE does not store a parameter used to generate the CCRS sequence, optionally, the transmitter 120 sends, to the UE within the coverage area of the base station, one or more of the following generation parameters generated by the processor 130: a quantity of RUs in which the CCRS sequence is located, a location of an RU in which the CCRS sequence is located on a time-frequency resource, a value of N, a generation method of the CCRS sequence, a mapping pattern of the CCRS sequence on an occupied RU, a pseudo-random sequence, a sub-band sequence number, and an index number of a generation parameter set that includes the generation parameters. In this manner, the processor 130 may update or adjust, based on factors such as a channel status, a load status, and an interference (including inter-cell interference and intra-cell interference) status, parameters such as a period, a location, and the like that are used for sending the common control information and the cell control reference information, so that system resources can be effectively scheduled. Correspondingly, the processor 130 further updates, based on an updated parameter, a program or the mapping pattern stored in the memory 140. Optionally, the memory 140 is configured to store the generation parameters or the index number of a generation parameter set that includes these generation parameters.

Correspondingly, a UE 200 includes: an antenna 210, a receiver 220, a processor 230, and a memory 240. The antenna 210 may be a plurality of antennas or a single antenna, and is configured to receive common control information and a CCRS sequence.

The receiver 220 receives, by using the antenna 210, a signal sent by a base station on one or more resource units RUs of N antenna ports, where the signal includes common control information and a CCRS sequence.

The memory 240 is configured to store a mapping pattern, program code that can be executed by the processor, and a pseudo-random sequence.

The processor 230 is configured to: generate, based on the program code stored in the memory and the pseudo-random sequence, a to-be-mapped CCRS sequence; and map the to-be-mapped CCRS sequence to the one or more RUs of the N antenna ports to generate a CCRS sequence. For how to design a mapping pattern of the CCRS sequence on an RU, how to generate a generation manner of the to-be-mapped CCRS sequence, and how to map the to-be-mapped CCRS sequence to the one or more RUs of the N antenna ports, refer to the description in the foregoing method embodiments. Details are not described herein again.

The processor 230 further obtains, based on the generated CCRS sequence, the common control information from the signal received by the receiver 220.

Optionally, the receiver 220 is configured to transmit, to the processor 230, one or more of the following generation parameters that are received from the antenna 210: a quantity of RUs in which the CCRS sequence is located, a location of an RU in which the CCRS sequence is located on a time-frequency resource, a value of N, a generation method of the CCRS sequence, a mapping pattern of the CCRS sequence on an occupied RU, a pseudo-random sequence, a sub-band sequence number, and an index number of a generation parameter set that includes the generation parameters. The processor 230 updates, based on the received parameter, a program or the mapping pattern stored in the memory 240.

Optionally, the memory 240 is configured to store the generation parameters or the index number of a generation parameter set that includes these generation parameters.

In the several embodiments provided in this application, it should be understood that the disclosed apparatus and method may be implemented in other manners. For example, the described apparatus embodiments are merely examples. For example, the device division is merely logical function division and may be other division in actual implementation. For example, a plurality of devices may be combined to form a new device. In addition, the displayed or discussed mutual couplings or direct couplings or communication connections may be implemented by using some interfaces. The indirect couplings or communication connections between the apparatuses, devices, or units may be implemented in electronic, mechanical, or other forms. The components in the embodiments of this application are physical units, and some functions of the components may be implemented by using software, or may be implemented by using hardware. A person skilled in the art may select a corresponding implementation based on an actual requirement. The processor of the present invention may be a general purpose processor, may be an integrated circuit, or may be a chip.

In addition, functional units in the embodiments of this application may be integrated into one processing unit, or each of the units may exist alone physically, or two or more units are integrated into one unit.

What is claimed is:

1. A method for sending cell control reference information, comprising:

generating, by a base station having M antenna ports and before common control information needs to be sent, the cell control reference information used to detect the common control information, wherein generating the cell control reference information comprises generating a to-be-mapped cell control reference signal sequence based on a pseudo-random sequence before the common control information needs to be sent;

mapping, by the base station, the common control information and the cell control reference information to one or more resource units (RUs) of N antenna ports, wherein the N antenna ports are a subset of the M antenna ports, wherein M and N are positive integers, and wherein N<M; and sending, by the base station and using the one or more RUs of the N antenna ports, the common control information and the cell control reference information to a user equipment (UE) within a coverage area of the base station, wherein the pseudo-random sequence is initialized in the following manner:

$$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3, \text{ wherein}$$

$c(0)$ is an initial value of the pseudo-random sequence, $n_s$ is a subframe sequence number when the base station sends the common control information and the cell control reference information, $l$ is a symbol sequence number of the cell control reference information in a subframe when the base station sends the cell control reference information, $N_{ID}^{cell}$ is an ID of a cell in which the base station is located, $p_1$ is a sequence number/ sequence numbers of the one or more RUs, $p_2$ is an antenna port number of an antenna port of the N antenna ports, $p_3$ is a frame sequence number when the base station sends the common control information and the cell control reference information, and $\alpha_1$, $\alpha_2$, and $\alpha_3$ are coefficients.

2. The method according to claim 1, wherein the generating a to-be-mapped cell control reference signal sequence based on a pseudo-random sequence comprises generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

wherein
j is an imaginary number symbol, $c(m)$ is the pseudo-random sequence, $m$ is a subcarrier sequence number of the RU in which the cell control reference signal is located, m=0, 1, . . . , and $xN_{RU}^{CCRS,DL}-1$, $x$ represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

3. The method according to claim 1, wherein the pseudo-random sequence is a Gold sequence, an m sequence, or a Zadoff-Chu sequence.

4. The method according to claim 1, wherein mapping the to-be-mapped cell control reference signal sequence to one or more RUs of the N antenna ports comprises mapping all or some to-be-mapped cell control reference signal sequences to the one or more RUs of the N antenna ports based on a preset mapping pattern.

5. The method according to claim 4, wherein the mapping all or some to-be-mapped cell control reference signal sequences to the one or more RUs of the N antenna ports based on a preset mapping pattern comprises mapping all or some to-be-mapped cell control reference signal sequences to the one or more RUs of the N antenna ports based on at least one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

6. The method according to claim 1, wherein the N antenna ports are preset or are selected by the base station from the M antenna ports.

7. A base station for sending cell control reference information, wherein the base station comprises M antenna ports, a transmitter, at least one processor, and a memory, wherein:
the memory is configured to store program code executed by the at least one processor;
the memory is further configured to store a pseudo-random sequence;
the at least one processor is configured to:
before common control information needs to be sent, generate, based on the program code stored in the memory, the cell control reference information used to detect the common control information;
before the common control information needs to be sent, generate, based on the program code stored in the memory and the pseudo-random sequence, a to-be-mapped cell control reference signal sequence;
map the common control information and the cell control reference information to one or more resource units (RUs) of N antenna ports, wherein the N antenna ports are a subset of the M antenna ports, wherein M and N are positive integers, and wherein N<M; and
initialize the pseudo-random sequence in the following manner based on the program code stored in the memory:

$c(0)=2^{10}\cdot(7\cdot(n_s+1)+l+1)\cdot(2\cdot N_{ID}^{cell}+1)+2\cdot N_{ID}^{cell}+\alpha_1 p_1+\alpha_2 p_2+\alpha_3 p_3$, wherein $c(0)$ is an initial value of the pseudo-random sequence, $n_s$ is a subframe sequence number when the base station sends the common control information and the cell control reference information, $l$ is a symbol sequence number of the cell control reference information in a subframe when the transmitter sends the cell control reference information, $N_{ID}^{cell}$ is an ID of a cell in which the base station is located, $p_1$ is a sequence number/sequence numbers of the one or more RUs, $p_2$ is an antenna port number of an antenna port of the N antenna ports, $p_3$ is a frame sequence number when the base station sends the common control information and the cell control reference information, and $\alpha_1$, $\alpha_2$, and $\alpha_3$ are coefficients; and
the transmitter is configured to send, by using the one or more RUs and the N antenna ports, the common control information and the cell control reference information to a user equipment (UE) within a coverage area of the base station.

8. The base station according to claim 7, wherein the generating a to-be-mapped cell control reference signal sequence based on a pseudo-random sequence comprises generating the to-be-mapped cell control reference signal sequence r in the following manner after the pseudo-random sequence is initialized:

$$r_{l,n_s,p_1,p_2,p_3}(m) = \frac{1}{\sqrt{2}}(1-2c(2m)) + j\frac{1}{\sqrt{2}}(1-2c(2m+1)),$$

wherein
j is an imaginary number symbol, $c(m)$ is the pseudo-random sequence, $m$ is a subcarrier sequence number of the RU in which the cell control reference signal is located, m=0, 1, . . . , and $xN_{RU}^{CCRS,DL}-1$, $x$ represents a quantity of subcarriers on any one of the one or more RUs or a quantity of subcarriers occupied by the cell control reference signal on any one of the one or more RUs, and $N_{RU}^{CCRS,DL}$ represents a quantity of the one or more RUs.

9. The base station according to claim 7, wherein the pseudo-random sequence is a Gold sequence, an m sequence, or a Zadoff-Chu sequence.

10. The base station according to claim 7, wherein mapping the cell control reference information to the one or more resource units RUs of the N antenna ports comprises mapping all or some to-be-mapped cell control reference signal sequences to the one or more RUs of the N antenna ports based on a preset mapping pattern.

11. The base station according to claim 10, wherein the mapping all or some to-be-mapped cell control reference signal sequences to the one or more RUs of the N antenna ports based on a preset mapping pattern comprises mapping all or some to-be-mapped cell control reference signal sequences to the one or more RUs of the N antenna ports based on at least one of the following parameters: a quantity of all resource elements of the one or more RUs, a quantity of all resource elements that are used to send the cell control reference information in the one or more RUs, a quantity of resource elements that are used to send the cell control reference information in any one of the one or more RUs, and a quantity of resource elements occupied by any one of the one or more RUs.

12. The base station according to claim 7, wherein the memory stores information about the N antenna ports; or the at least one processor is further configured to select the N antenna ports from the M antenna ports.

\* \* \* \* \*